(12) United States Patent
Ueyoko

(10) Patent No.: US 6,269,856 B1
(45) Date of Patent: Aug. 7, 2001

(54) PNEUMATIC TIRE WITH SPECIFIC SIDE AND BEAD DIMENSIONS

(75) Inventor: Kiyoshi Ueyoko, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 08/997,009

(22) Filed: Dec. 23, 1997

(30) Foreign Application Priority Data

Jan. 9, 1997 (JP) .................................................. 9-002306
Apr. 30, 1997 (JP) .................................................. 9-112556

(51) Int. Cl.[7] .................................. B60C 3/04; B60C 3/00
(52) U.S. Cl. ............................................. 152/454; 152/539
(58) Field of Search .................................... 152/454, 525, 152/539, 552, 546, 554

(56) References Cited

U.S. PATENT DOCUMENTS

| | | | |
|---|---|---|---|
| 4,086,948 | * 5/1978 | Suzuki et al. | 152/554 |
| 5,392,830 | * 2/1995 | Janello et al. | 152/555 |
| 5,479,977 | * 1/1996 | Tamano et al. | 152/542 |
| 5,526,863 | * 6/1996 | Hodges | 152/541 |
| 5,622,576 | * 4/1997 | Lobb et al. | 152/454 |
| 5,885,388 | * 3/1999 | Ueyoko et al. | 152/539 |

\* cited by examiner

Primary Examiner—Michael W. Ball
Assistant Examiner—Barbara J. Musser
(74) Attorney, Agent, or Firm—Birch, Stewart, Kolasch & Birch, LLP

(57) ABSTRACT

A pneumatic tire has an outer surface provided with a mid-lower sidewall contour S1 and a lower sidewall contour S2, the contour S1 extends radially inwardly from the maximum cross sectional width point P1 of the tire to a point P12 along a circular arc line E1 having a single radius R1 and the center on an axial line passing the maximum cross sectional width point P1, the contour S2 extends on the axially inside of the circular arc line E1 from the point P2 to a radially inner point P3, the rubber thickness T measured from the tire outer surface to the main portion of a carcass is gradually increased from the point P1 to the point P2. The bead portions are provided between the carcass main portion and each turnup portion with a bead apex made of hard rubber tapering radially outwardly to the radially outer end thereof, the carcass turnup portion extends radially outwardly beyond the radially outer end of the bead apex to form a parallel part, the parallel part extending radially outwardly from the radially outer end of the bead apex in substantially parallel with the carcass main portion, and the length L of the parallel part is in the range of from 0.5 to 5.0 times the maximum-section-width CW of the bead core.

15 Claims, 10 Drawing Sheets

Fig.10
0.5 kgf/sq.cm pressure
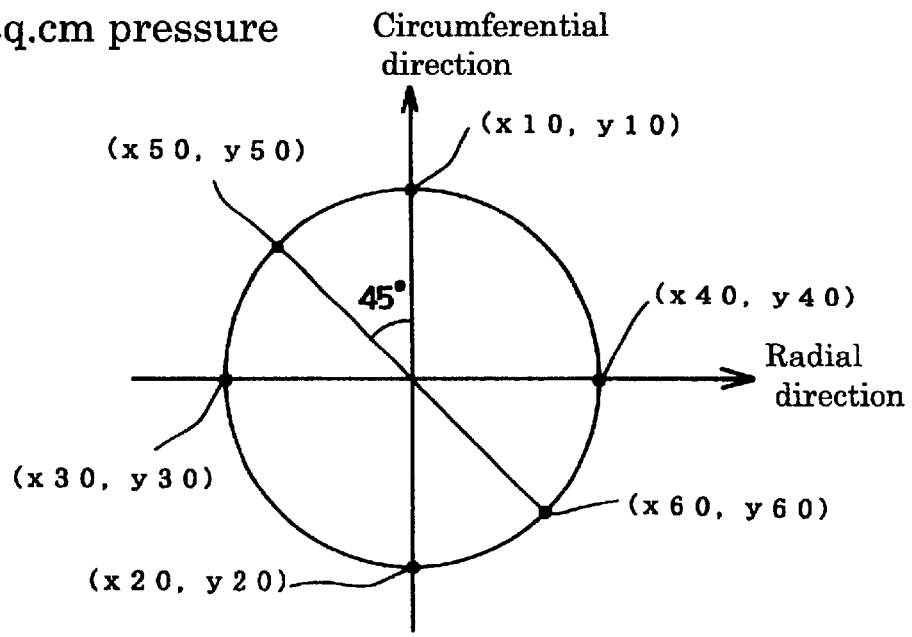
Standard pressure
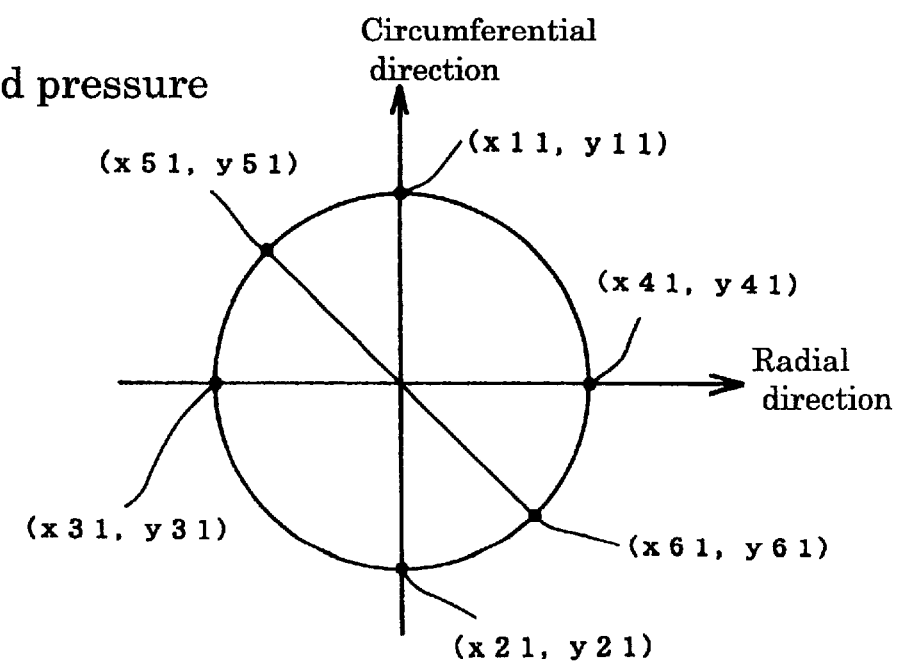

PNEUMATIC TIRE WITH SPECIFIC SIDE AND BEAD DIMENSIONS

The present invention relates to a pneumatic tire, more particularly to an improved bead and lower sidewall structure which is capable of improving the bead durability, tire weight, crack resistance and the like and thus can be suitably employed in heavy-duty radial tires.

In heavy duty radial tires for trucks, buses and the like, in order to increase the durability of the bead portions, conventionally, reinforcing cord layers and a great volume of hard rubber are disposed in the bead portions as shown in FIG. 7. However, in very severe service conditions under which such tires are often used, the increased rubber volume increases heat generation, and the bead durability is quickly lost. Further, the tire weight is inevitably increased, and the fuel consumption of the vehicles is also increased over time.

In Japanese Patent Publication No. JP-A-55-19685, a radial tire is disclosed, wherein a lower sidewall region is profiled so as to increase the flexibility of the sidewall portions. If the teachings thereof are applied to a heavy duty tire, as shown in FIG. 12, the rubber thickness t1 is almost constant in a region y1 which region extends from the tire maximum cross sectional width point P1 to a relatively lower point P2, and from the point P2 the thickness t2 abruptly increases. As a result, the rubber volume can be decreased. However, as the tire surface changes from convex to concave at the point P2, and the concave part y2 is positioned on the axially outside of the convex surface line e1, the bending deformation during running concentrates on the pint P2, and the bead durability is not good.

On the other hand, if the rubber volume is decreased, it is probable that such a tire is increased in the bending deformation in the lower sidewall region and upper bead region. As a result, the outer surface of the tire is liable to crack in that region, which sometimes induces bead damages such as loose end carcass ply. Further, it is impossible to retread the tires with cracked outer surfaces.

It is therefore, an object of the present invention to provide a pneumatic tire with improved durability and tire weight.

According to one aspect of the present invention, a pneumatic tire comprises a tread portion, a pair of sidewall portions, a pair of bead portions with a bead core therein, a carcass extending between the bead portions and turned up around the bead cores from the inside to the outside of the tire to form a pair of turnup portions and a main portion therebetween, the outer surface of the tire provided with a mid-lower sidewall contour S1 and a lower sidewall contour S2, the mid-lower sidewall contour S1 extending radially inwardly from the maximum cross sectional width point P1 of the tire to a point P2 along a circular arc line E1 having the center on an axial line passing the maximum cross sectional width point P1, the lower sidewall contour S2 extending on the axially inside of the circular arc line E1 from the point P2 to a radially inner point P3, and the thickness T measured from the outer surface of the tire to the main portion of the carcass is gradually increased from the point P1 to the point P2.

Preferably, the bead portions are provided between the carcass main portion and each turnup portion with a bead apex made of hard rubber tapering radially outwardly to the radially outer end thereof, and the turnup portion extends radially outwardly beyond the radially outer end of the bead apex to form a parallel part, the parallel part extending radially outwardly from the radially outer end of the bead apex in substantially parallel with the carcass main portion, and the length L of the parallel part is in the range of from 0.5 to 5.0 times the maximum-section-width CW of the bead core.

Embodiments of the present invention will now be described in detail in conjunction with the accompanying drawings.

FIG. 4 (A) and (B) are schematic cross sectional views for explaining the contour of the bead and sidewall lower portion.

Figure 5:
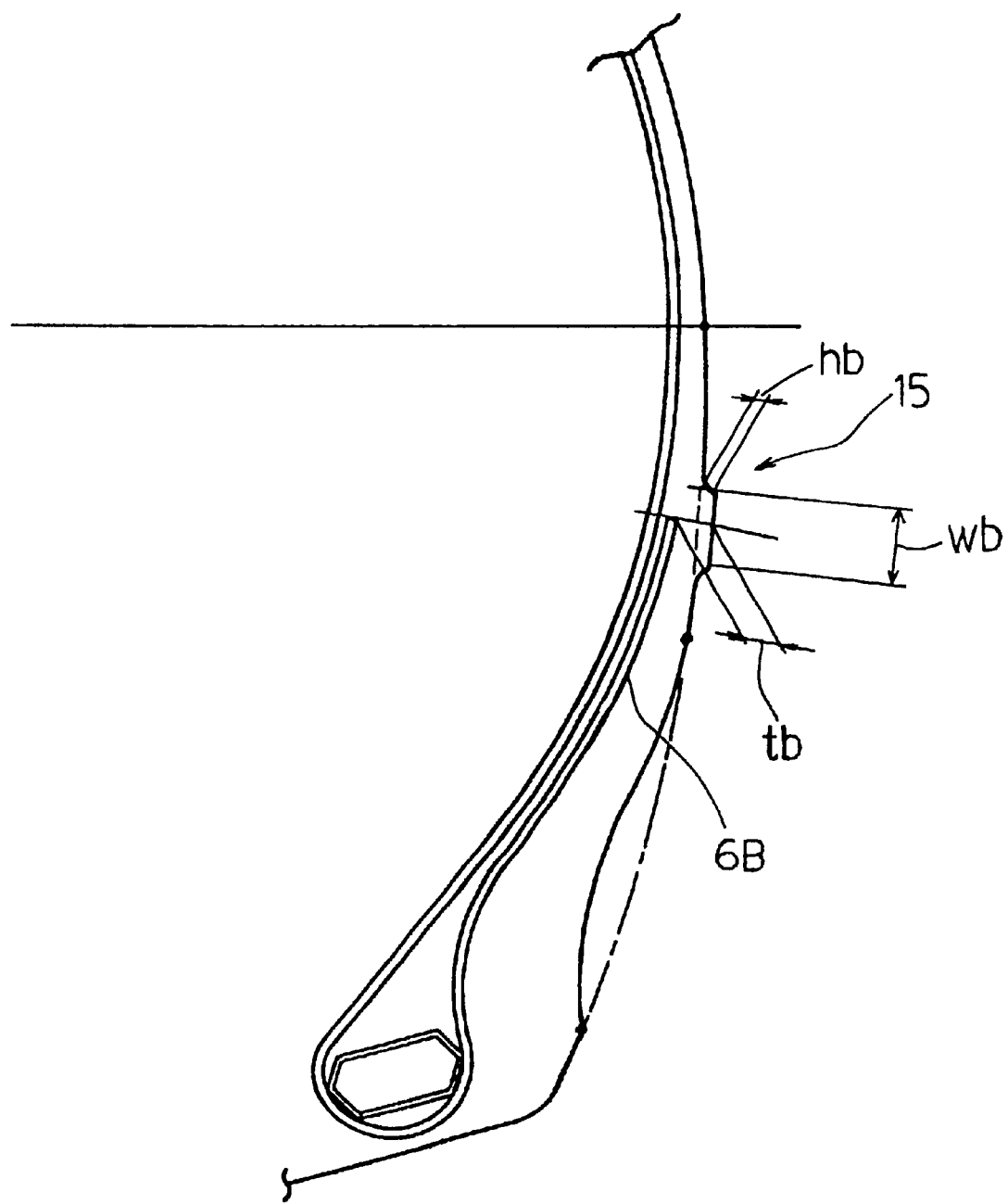

FIG. 5 is a cross sectional view showing a decorative rib on the sidewall.

Figure 6:
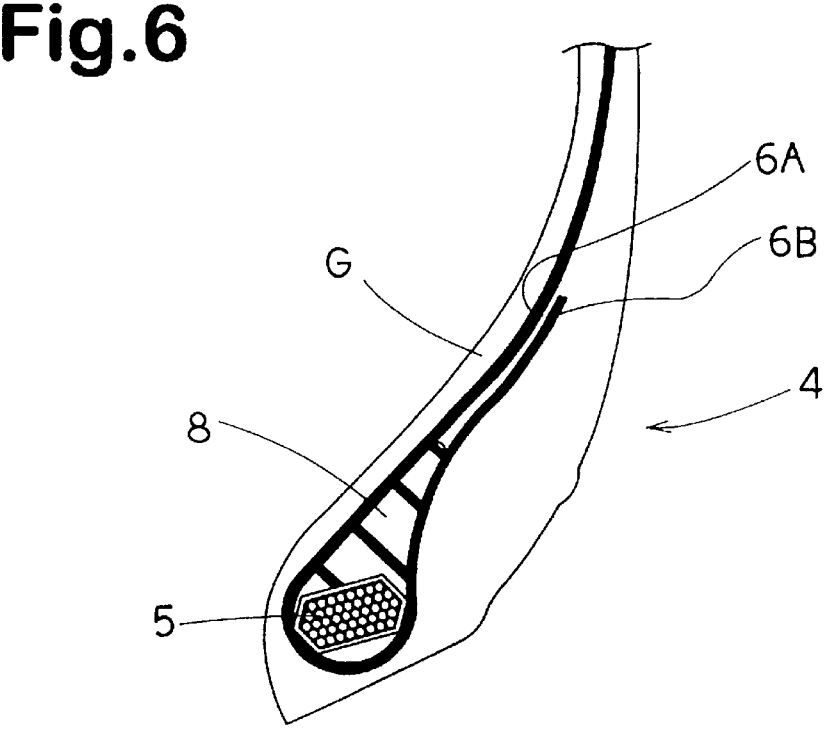

FIG. 6 is a cross sectional view showing another example of the bead and lower sidewall structure.

Figure 7:
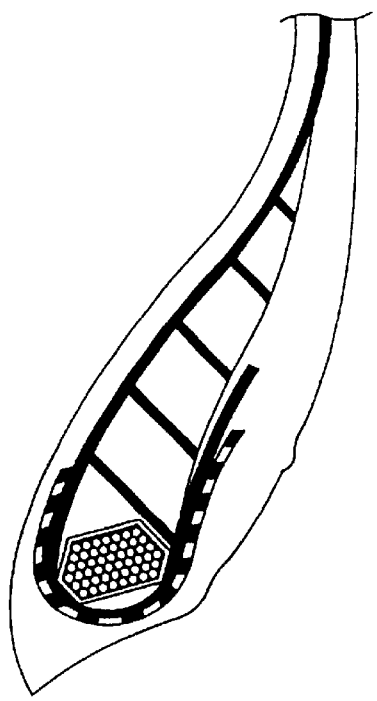

FIG. 7 is a cross sectional view showing a prior art.

Figure 8:
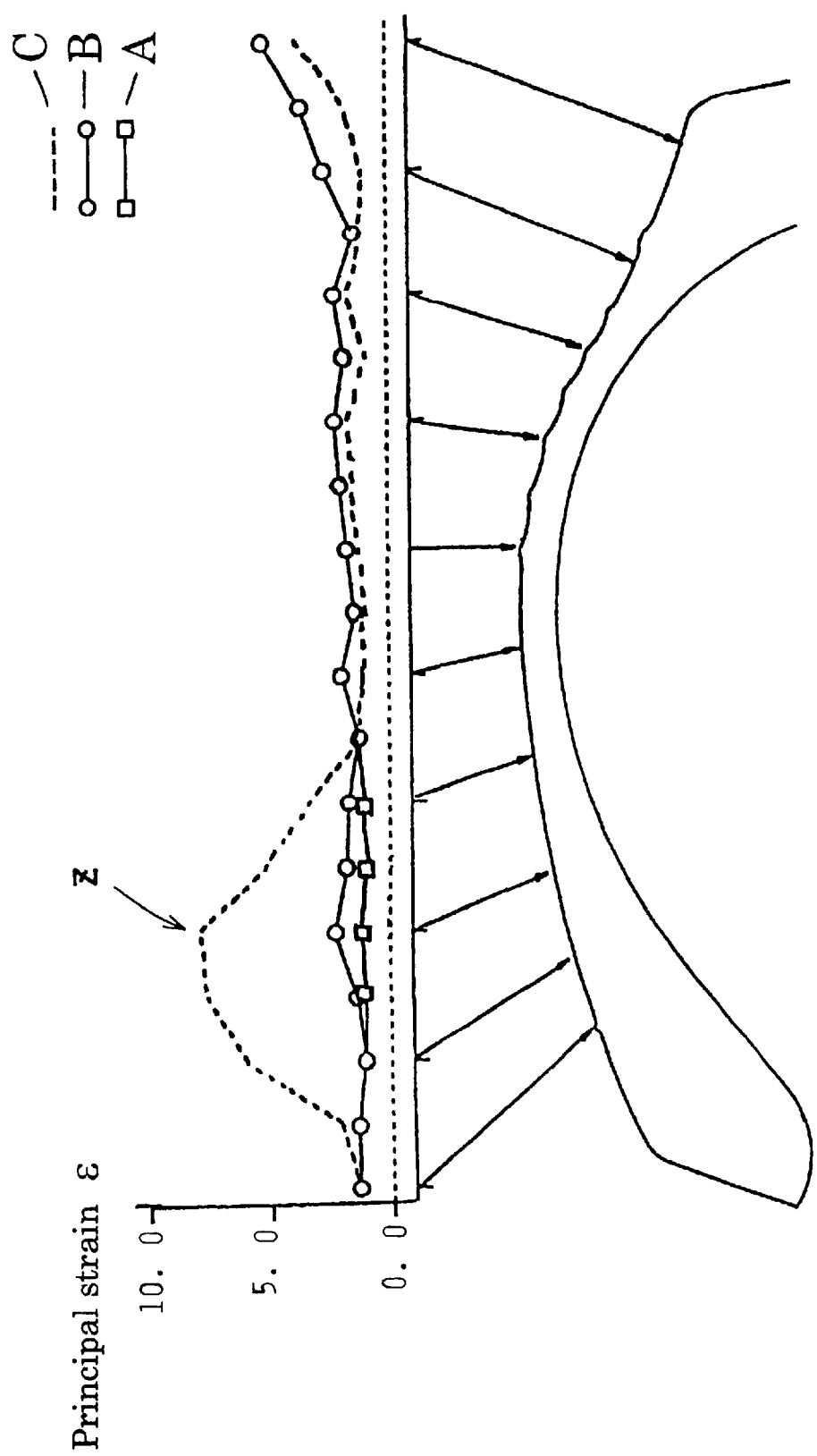

FIG. 8 is a graph showing the results of a test for principal strain.

Figure 9:
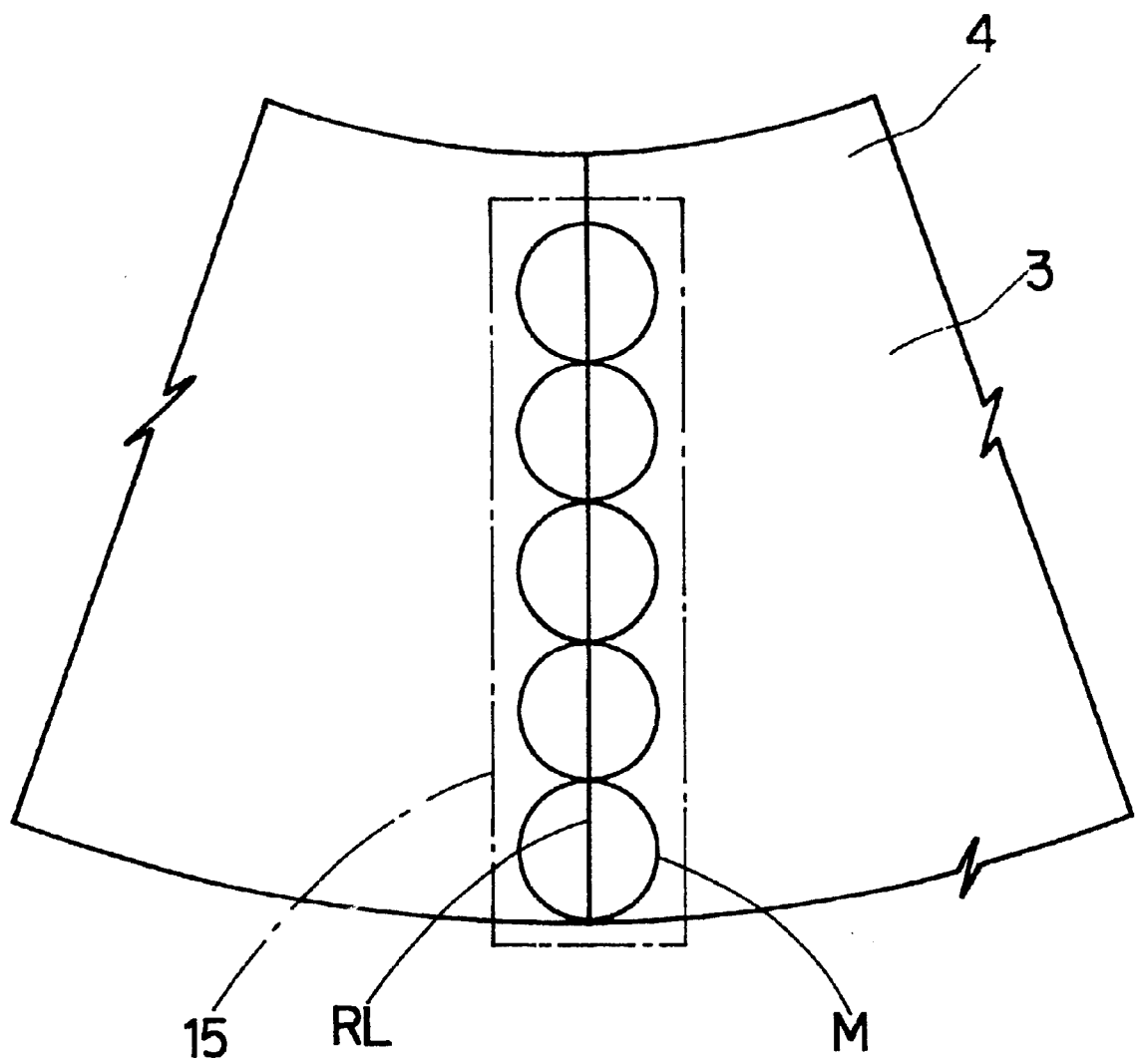

FIGS. 9 and 10 are diagrams for explaining a method of measuring the principal strain.

Figure 11:
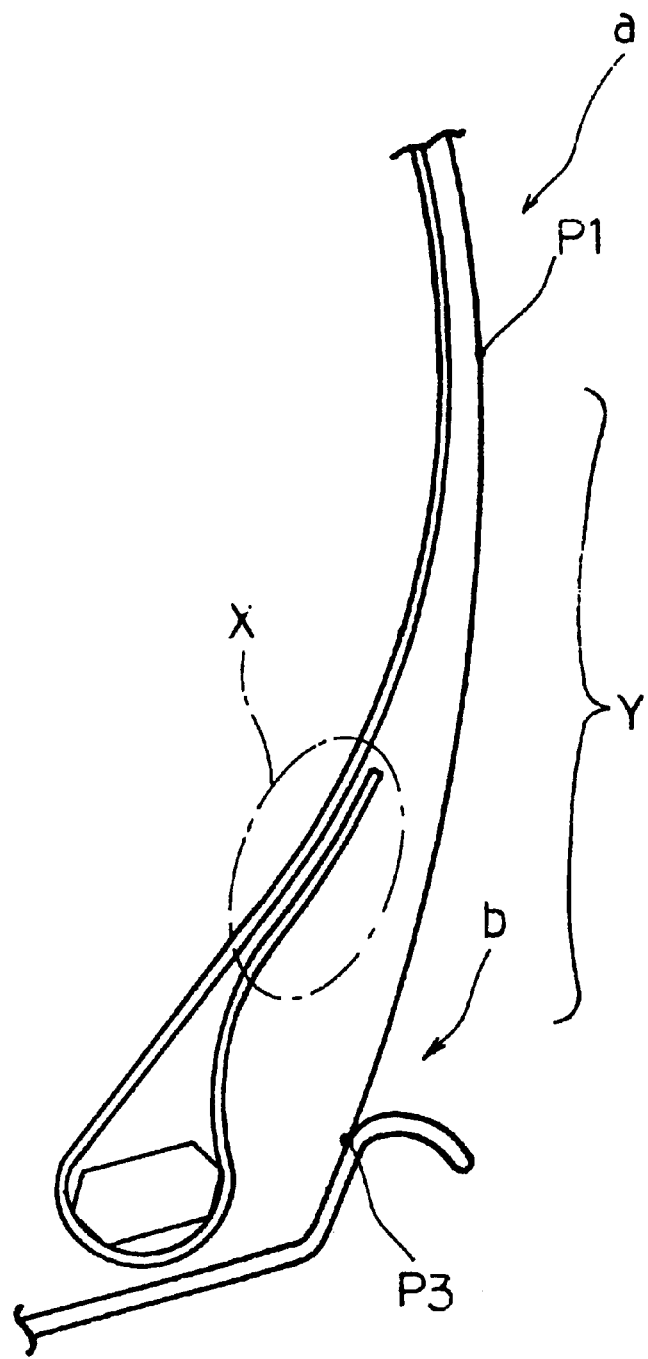

FIG. 11 is a cross schematic sectional view of the bead and lower sidewall structure of a test tire according to the invention.

Figure 12:
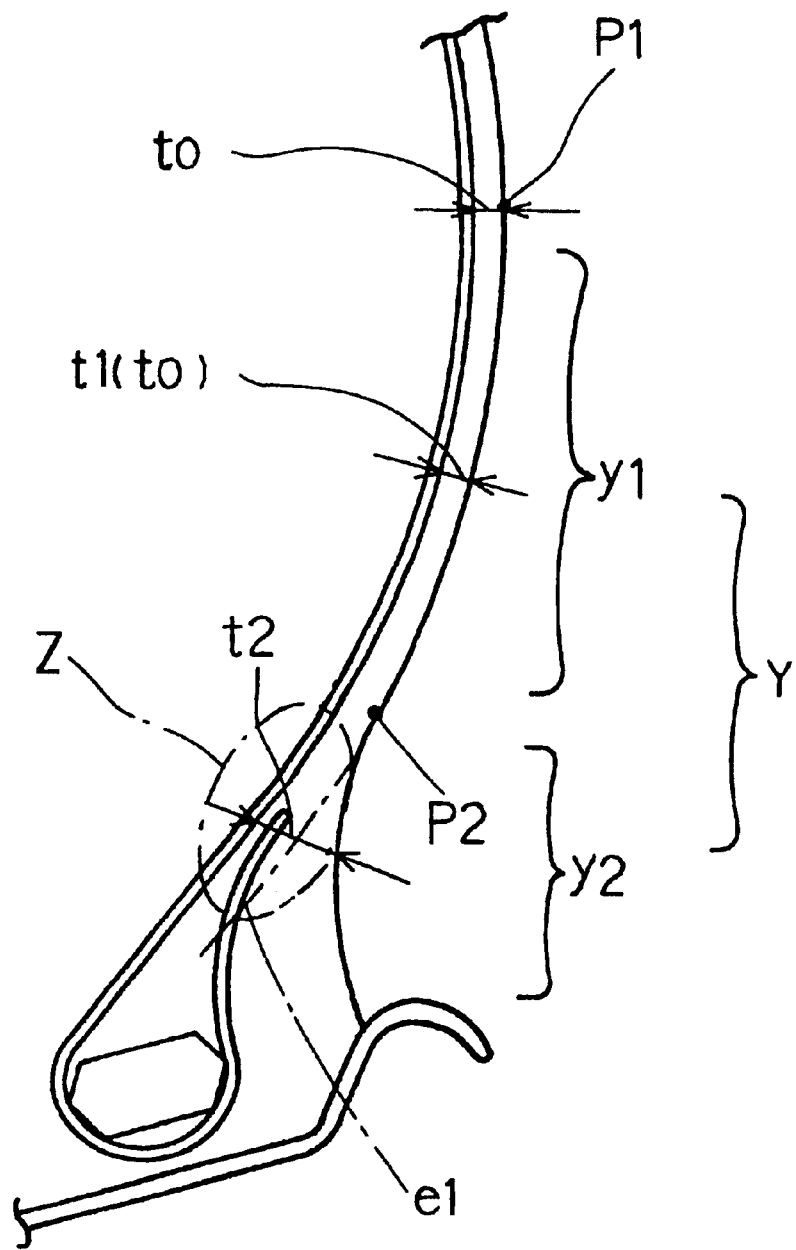

FIG. 12 is a cross schematic sectional view of the bead and lower sidewall structure of a test tire according to a prior art.

In the drawings, the tire 1 according to the present invention comprises a tread portion 2, a pair of axially spaced bead portions 4 with a bead core therein, a pair of sidewall portions 3 extending between the tread edges and the bead portions, a carcass 6 extending between the bead portions 4, and a belt 7 disposed radially outside the carcass 6 in the tread portion 2.

Figure 1:
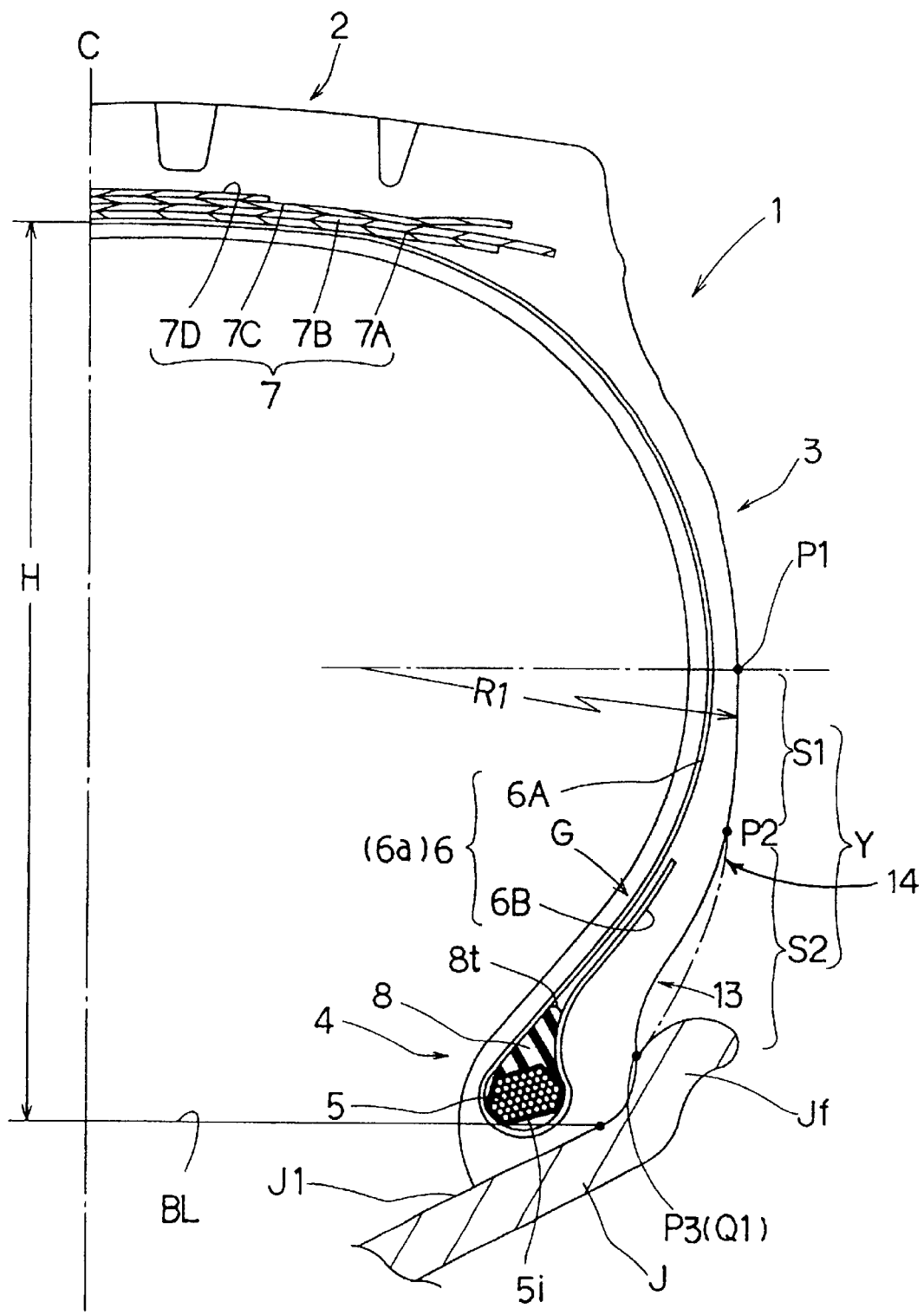
FIG. 1 is a cross sectional view of an embodiment of the present invention.

FIG. 1 shows a meridian section of the tire under the standard condition in which the tire is mounted on a standard rim J and inflated to a standard pressure and loaded with no tire load. The standard rim is a rim specified as standard rim or measuring rim in the well known standards, such as JATMA (Japan and Asia), T&RA (North America), ETRTO (Europe), STRO (Scandinavia) and the like, and the standard pressure is a maximum pressure specified in the standard.

In this embodiment, the tire 1 is a tube-less heavy-duty radial tire for trucks and buses, which is mounted on a 15 deg. taper rim.

The above-mentioned carcass 6 comprises at least one ply 6$a$ of cords arranged radially at an angle of from 70 to 90 degrees with respect to the tire equator C, and extending between the bead portions 4 through the tread portion 2 and the sidewall portions 3, and turned up around the bead cores 5 from the axially inside to outside of the tire, so as to form a pair of turnup portions 6B and a main portion 6A therebetween. For the carcass cords, preferably, steel cords are used, but organic fiber cords, e.g. polyester, rayon, nylon, aromatic polyamide and the like can be used. In this example, the carcass 6 is composed of a single ply 6$a$ of steel cords arranged at substantially 90 degrees with respect to the tire equator C.

The belt 7 comprises at least two cross plies. For the belt cords, steel cords, organic fiber cords, e.g. nylon, aromatic polyamide, rayon, nylon and the like can be used. In this example, the belt 7 is composed of four plies; a radially innermost ply 7A made of parallel steel cords laid at a predetermined angle of 50 to 70 degrees with respect to the tire equator C; and radially outer plies 7B, 7C and 7D made of parallel steel cords laid at angles of not more than 30 degrees with respect to the tire equator C.

Each of the bead portions 4 is provided with a bead apex 8 made of a hard rubber compound. The bead apex 8 is disposed between the carcass ply main portion 6A and turnup portion 6B, and tapers radially outwardly from the bead core 5. Preferably, the bead apex 8 has a JIS A hardness of 60 to 99 degrees, more preferably 70 to 95 degrees.

Under the above-mentioned standard condition, the bead apex height HPm is in the range of from 6 to 31%, preferably 8 to 22%, more preferably 8 to 14% of the carcass height H. (in FIG. 2 about 11%)

The bead apex height HPm is measured radially between the radially outer end of the bead apex and the bead base line BL. The carcass height H is measured radially between the thickness center line of the carcass and the bead base line BL along the tire equator C. Incidentally, the bead base line BL corresponds with the rim diameter of the standard rim.

The axially inner surface of the bead apex 8 which contacts with the carcass main portion 6A is defined by a substantially straight line, but the axially outer surface is defined by a concave line. As a result, the axially outward displacement of the carcass 6 when the tire is loaded can be controlled.

The bead core 5 in this example is formed in a hexagonal cross sectional shape by winding a steel wire, and the outside thereof is coated with rubber. Aside from steel wire, high modulus organic cords, e.g. aromatic polyamide and the like may be used. A radially inner side 5$i$ of the hexagon is longest and inclined at almost 15 degrees with respect to the axial direction corresponding to the inclination of the tapered bead seat J1 of the rim J. The maximum-section-width CW of the bead core 5 lies in a direction substantially parallel with the bead bottom line.

As for the carcass 6, in order to minimize a stress concentration on the turnup end, the turnup portion 6B is extended radially outwardly to a position at a predetermined height Hb which position is radially outward of the outer end 8$t$ of the bead apex 8 but radially inward of the maximum width point P1 of the tire. The height Hb measured from the bead base line BL is preferably set in the range of from 15 to 50%, more preferably 20 to 40% of the carcass height H. (in this example 29%)

The carcass turnup portion 6B extends radially outwardly from the axially outer extreme end of the bead core to the radially outer end of the bead apex 8 along the axially outer concave surface of the bead apex 8, and then extends substantially in parallel with the carcass main portion 6A, on the radially outside of the bead apex 8. The length L of this parallel part G is in the range of from 0.5 to 5.0 times, preferably 1.0 to 4.0 times, more preferably 2.0 to 4.0 times the maximum-section-width CW of the bead core 5. (in this example about 2.6 times)

Figure 3:
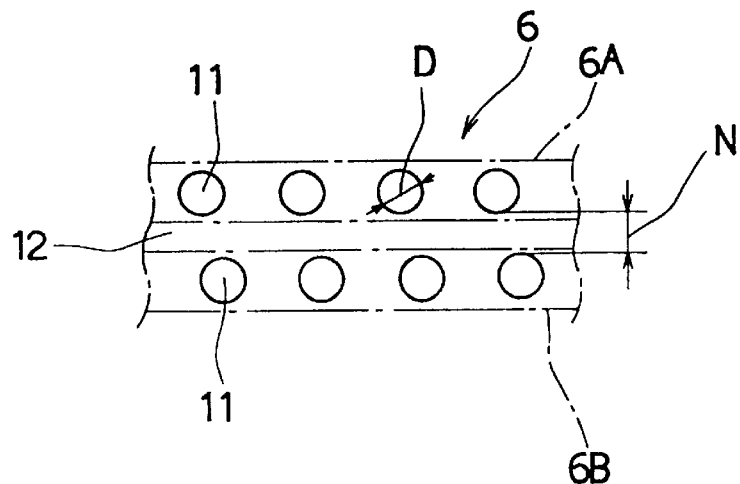
FIG. 3 is a schematic cross sectional view showing a cushion rubber layer between the carcass ply turnup portion and main portion.

In the parallel part G, as shown in FIG. 3, the cord spacing N between the axially adjacent carcass main portion 6A and turnup portion 6B is set in the range of from 1.0 to 4.5 times, preferably 1.5 to 3.5 times the diameter D of the carcass cords 11. That is, a rubber layer whose minimum thickness corresponds to the cord spacing N exists between the carcass main portion 6A and turnup portion 6B, whereby the share therebetween can be effectively mitigated. If the cord spacing N is less than 1.0 times the diameter D, the mitigation becomes insufficient, and sometimes the cords of the turnup portion 6B partially come into direct contact with those of the main portion 6A which causes carcass cord loose. In this example, a separate rubber layer 12 called cushion rubber having elastic characteristics similar to the topping rubber for the carcass ply is disposed between the main portion 6A and turnup portion 6B. However, it is also possible to use the topping rubber itself as a substitute for the cushion rubber layer 12 if a required uniform thickness can be obtained. In case the carcass 6 is composed of two or more plies, it is necessary that at least one ply has the above-explained parallel part G.

In the meridian section of the tire under the above-mentioned standard condition, to effectively reduce the tire weight without deteriorating the durability, the tire is provided in a region Y which is radially inward of the maximum cross-sectional width point P1 with a mid-lower sidewall contour S1 and a lower sidewall contour S2.

The mid-lower sidewall contour S1 extends from the maximum width point P1 to a radially inner point P2 along a circular arc E1 of a single radius R1 of which center is placed on an axial line passing the maximum width points P1. Thus the mid-lower sidewall contour S1 is convex.

The lower sidewall contour S2 is defined as extending on the axially inside of the circular arc line E1. The lower sidewall contour S2 is usually composed of a transitional convex upper contour 14 and a concave lower contour 13.

The convex upper contour 14 extends along a convex curved line, which is preferably a circular arc having a radius R2 in the range of from 0.2 to 0.4 times the radius R1. The convex upper contour 14 is connected to the mid-lower sidewall contour S1 at a point P2 without any infecting point.

The concave lower contour 13 extends along a concave curved line E2, which is preferably a circular arc having a single radius R3 in the range of not more than 0.95 times the radius R2. The concave lower contour 13 is connected to the convex upper contour 14 without any infecting point.

Figure 4A:
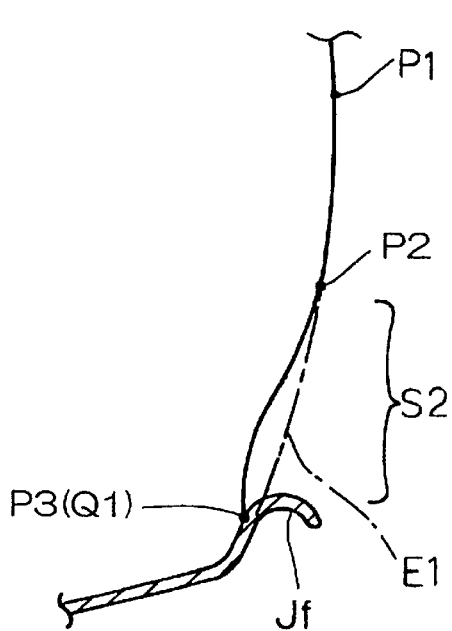

FIGS. 4(A) and (B) show two possible cases of the position (point P3) of the radially inner end of the lower sidewall contour S2.

In case of FIG. 4(A), the lower sidewall contour S2 does not intersect the circular arc line E1, and contacts with the rim flange Jf at a point Q1 (hereinafter contact point Q1). Thus the point P3 is this contact point Q1.

Figure 4B:
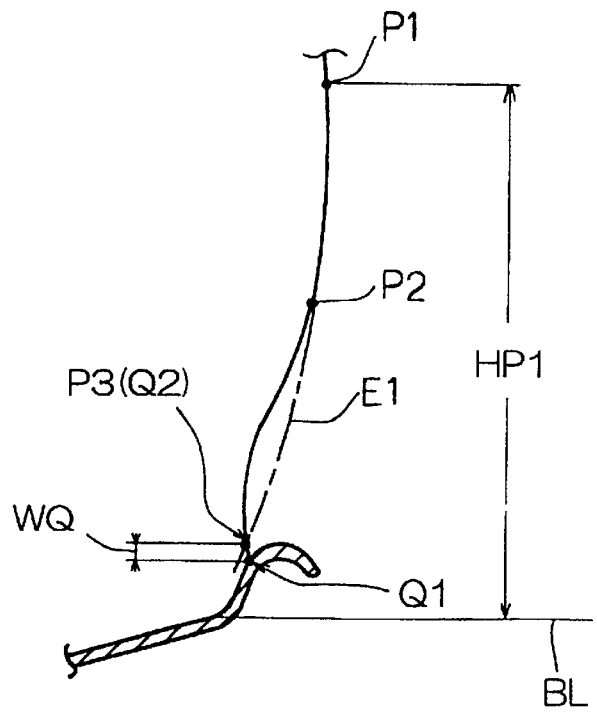

In case of FIG. 4(B), the lower sidewall contour S2 intersects the circular arc line E1 at point Q2. Thus the point P3 is this intersecting point Q2. In this case, the radial distance WQ between the intersecting point Q2 and the contact point Q1 is set to be not more than 0.1 times, preferably not more than 0.05 times the height Hp 1 of the maximum width point P1. If more than 0.1 times, the heat generation increases and the durability decreases.

Further, in order to further decrease the heat generation, the point Pm of the maximum depression Dm of the lower sidewall contour S2 from the circular arc line E1 is set at a radial height Hpm in the range of from 6 to 20%, preferably 9 to 20%, more preferably 12 to 18% of the tire section height H, and the maximum depression Dm is set in the range of from 0.03 to 0.18 times the height Hp1 of the maximum width point P1. Preferably, 0.05 =<Dm/Hp1. Preferably Dm/Hp1=<0.08, more preferably Dm/Hp1= <0.07. Usually, the maximum depression (Dm) is 3 to 6 mm. If Dm/Hp1<0.03, heat generation increases. If 0.18 <Dm/Hp1, it is difficult to set (T2/T1)/h1 and (Tm/T2)/h3 in the ranges mentioned below. Further, deformation increases between the points P1 and Pm and cord loose becomes liable to occur.

The radial distance h2 between the points P2 and P3 is in the range of from 0.2 to 0.7 times the height Hp1. Preferably 0.3=<h2/Hp1. Preferably h2/Hp1=<0.6. If h2/Hp1<0.2, the reduction in heat generation becomes insufficient, and further, the deformation is liable to concentrate on a position near the point Pm of the maximum depression Dm. If 0.7<h2/Hp1, deformation decreases in the mid-lower sidewall region (S1), but increases in the sidewall lower region (S2) especially between the points P2 and Pm. Thus it becomes impossible to disperse the deformation widely and uniformly.

The thickness T between the outer surface of the tire and the outside of the axially outermost carcass ply main portion 6A is gradually increased from the maximum width point P1 to the point P3 to disperse the strain widely and uniformly. However, it is not always necessary to increase the thickness T towards the radially inside in the region between the points P2 and Pm and/or the region between the points Pm and P3.

The thickness T1 at the maximum width point P1, the thickness T2 at the mid point P2, and the radial distance h1 between the points P1 and P2 are set as follows:

(T2/T1)/h1 is not less than 0.03, more preferably not less than 0.5; and (T2/T1)/h1 is not more than 1.0, more preferably not more than 0.07. If (T2/T1)h1<0.03, bending deformation concentrates on the sidewall lower region (S2), and carcass cord loose is liable to occur.

In order to provide a necessary strength for the sidewall portions 3, the thickness T1 must be not less than 3 mm.

The thickness T2 at the point P2, the thickness Tm at the point Pm, and the radial distance h3 between the points P2 and Pm are set as follows:

(Tm/T2)/h3 is not less than 0.03, more preferably not less than 0.05; and (Tm/T2)/h3 is not more than 0.25, more preferably not more than 0.15. If (Tm/T2)/h3<0.03, bending deformation concentrates on a portion near the point Pm. If 0.25<(Tm/T2)/h3, heat generation increases around the point Pm, and the tire weight increases. Further, bending deformation is liable to concentrate on a portion near the point P2 and the durability decreases.

The thickness Tm at the point Pm, the thickness T3 at the point P3, and the radial distance h4 between the points Pm and P3 are set as follows:

(T3/Tm)/h4 is not less than 0.03, preferably not less than 0.05, more preferably not less than 0.07. If (T3/Tm)/h4<0.03, bending deformation is liable to concentrate on a portion near the point P3 and carcass cord loose is liable to occur.

The above-mentioned radius R1 of the circular arc E1 is preferably set in the range of from 0.3 to 2.0 times the carcass height Ha. If R1/H<0.3, it is difficult to maintain the necessary thickness T in the mid-lower sidewall region (S1). Also it is difficult to gradually increase the thickness T towards the radially inside. If 2.0<R1/H, the thickness T excessively increases in the sidewall lower region (S2) and heat generation increases.

Further, in order to reduce the strain around the point Pm, the radially outer end of the carcass ply turnup portion 6B is extended radially outwardly beyond the point Pm, and the radial height difference therebetween is not less than 5 mm, preferably not less than 10 mm. In case a plurality of carcass plies are disposed, it is sufficient for this purpose that at least one carcass ply satisfies these conditions.

The present invention does not hinder provision of emboss marks, decorative rib and the like in the region Y. FIG. 5 shows such a decorative rib 15. In such a case, it is possible to terminate the turnup portion 6B within the width wb of the rib 15 because it is desirable that the rubber thickness tb from the turnup end to the tire outer surface is not less than 6 mm preferably not less than 9 mm. Preferably, the width Wb is set in the range of not more than 10 mm, and the protrusion hb of the decorative rib 15 from the tire outer surface is in the range of not more than 3 mm to prevent strain concentration.

FIG. 8 shows the maximum principal strain $\epsilon$ of three types of tires: tire A shown in FIG. 1 having the parallel part G and the contours S1 and S2; tire B shown in FIG. 6 having the parallel part G only; and tire C shown in FIG. 7 having neither the parallel part G nor the contours S1 and S2. In the tire C, a peak Z of principal strain (7 or 8%) appeared in the region Y. In the tires A and B, however, such a remarkable peak disappeared and the principal strain can be decreased to a almost uniform value of less than 4.0%. Thus, the sidewall portion 3 and bead portion 4 are effectively prevented from being cracked to improve durability.

If the length L of the parallel part G is less than 0.5 times the maximum-section-width CW of the bead core 5, a peak of principal strain $\epsilon$ appears in the region Y, and cracks are liable to occur in the peak position. If the length L is more than 5.0 times CW, the carcass turnup end reaches to the maximum width portion of the tire where the bending deformation is largest, and problems of ply edge loose and decrease in the bead durability arise. If the cord spacing N is more than 4.5 times the diameter D, a peak of principal strain $\epsilon$ appears in the region Y, and the heat generation is liable to increase.

The principal strain $\epsilon$ was obtained as follows: (1) buff the surface of the sidewall portion 3 and bead portion 4; (2) wash the surface with naphtha; (3) apply adhesive agent to the surface; (4) inflate the tire to a pressure of 0.5 kgf/sq.cm; (5) draw a radially extending strait line RL and copy a series of circles M from a vinyl tape 15 to the surface along the line RL as shown in FIG. 9 wherein the circles are printed in white ink (titanium oxide+DOP+castor oil) using a printing screen; (6) inflate the tire to the standard pressure; (7) copy the circles from the tire surface to a new blank tape; (8) measure the circles on the tapes (under the standard pressure and 0.5 kgf/sq.cm) for the abscissa values and ordinate values shown in FIG. 10; and (9) compute the principal strain $\epsilon$ using the following equations.

$$\text{Principal strain } \varepsilon = \frac{\varepsilon c + \varepsilon r}{2} + \frac{\sqrt{(\varepsilon c - \varepsilon r)^2 + r^2}}{2}$$

$$\text{Circumferential strain } \varepsilon c = \frac{Lc1 - Lc0}{Lc0}$$

$$\text{Radial strain } \varepsilon r = \frac{Lr1 - Lr0}{Lr0}$$

$$\text{Sharing strain } \gamma = \varepsilon c + \varepsilon r - 2X\varepsilon_{135}$$

$$135 \text{ degree direction strain } \varepsilon_{135} = \frac{L_{135}1 - L_{135}0}{L_{135}0}$$

Under 0.5 kgf/sq.cm pressure $$\text{Circumferential length } Lc0 = \sqrt{(X10 - X20)^2 + (Y10 - Y20)^2}$$

$$\text{Radial length } Lr0 = \sqrt{(X30 - X40)^2 + (Y30 - Y40)^2}$$

-continued $$135 \text{ degrees direction length } L_{135}0 = \sqrt{(X50-X60)^2 + (Y50-Y60)^2}$$

Under the standard pressure $$\text{Circumferential length } Lc1 = \sqrt{(X11-X21)^2 + (Y11-Y21)^2}$$

$$\text{Radial length } Lr1 = \sqrt{(X31-X41)^2 + (Y31-Y41)^2}$$

$$135 \text{ degrees direction length } L_{135}1 = \sqrt{(X51-X61)^2 + (Y51-Y61)^2}$$

Table 1 shows the results of a bead durability test. Using a tire test drum, test tires were run for 5000 km under the following extraordinary condition, and the running distance L1 until any visible damage appears was measured. In the table 1, the ratio of the running distance L1 to 5000 km is shown as the durability.

Tire load: 9000 kg
Speed: 20 km/h
Inner pressure: 800 kPa

The test tires had the following same structure except the contour in the region Y.

Tire size: 11R22.5 (heavy duty radial tire)
Rim size: 8.25×22.5
Internal tire structure: FIG. 1
Carcass: a single ply of steel cords (3×0.20+7×0.20) arranged at 90 degrees to the tire equator
Belt: four plies of steel cords (3×0.20+6×0.35)
Belt cord angle: +67, +18, −18 and −18 (radially inside to outside)
Carcass height Ha: 128 mm The specifications of the contours are also shown in Table 1.

Ex.4: The dispersion of strain was less and the durability was lower than Ex. 1–3 and 6–11 as the thickness T was constant (T2=Tm) from the point P2 to the point Pm, but better than Ref. 1 and 2.

Ex.5: As the thickness T2> the thickness Tm, the dispersion of strain was further decreased. The durability was lower than Ex.1–3 and 6–11 as the value h2/Hp1 was smaller, but higher than Ref.1 and 2.

Table 2 shows the results of additional tests. The test tires were heavy-duty radial tires having the following common data.

Tire size: 11R22.5
Rim size: 8.25×22.5
Carcass: a single ply of steel cords (3×0.20+7×0.20)
Carcass cord angle: 90 degrees to the tire equator
Carcass cords count: 40/5 cm
Belt: four plies of steel cords (3×0.20+6×0.35)
Belt cord angle: +67, +18, −18 and −18 (radially inside to outside)
Belt cord count: 26/5 cm The tests included a durability test similar to the above-mentioned test, crack test, principal strain test, and tire weight test.

* Durability Test

Using a tire test drum, test tires were run for 10000 km under the following extraordinary condition, and the running distance L1 until any visible damage appears was measured. In the table 2, the ratio of the running distance L1 to 10000 km is shown as the durability.

Tire load: 9000 kg
Speed: 20 km/h
Inner pressure: 1000 kPa

* Crack Resistance Test

The test tires inflated to the standard pressure of 800 kPa was set in an ozone chamber (Ozone: 40 ppm, Temperature:

TABLE 1

Figure 2:
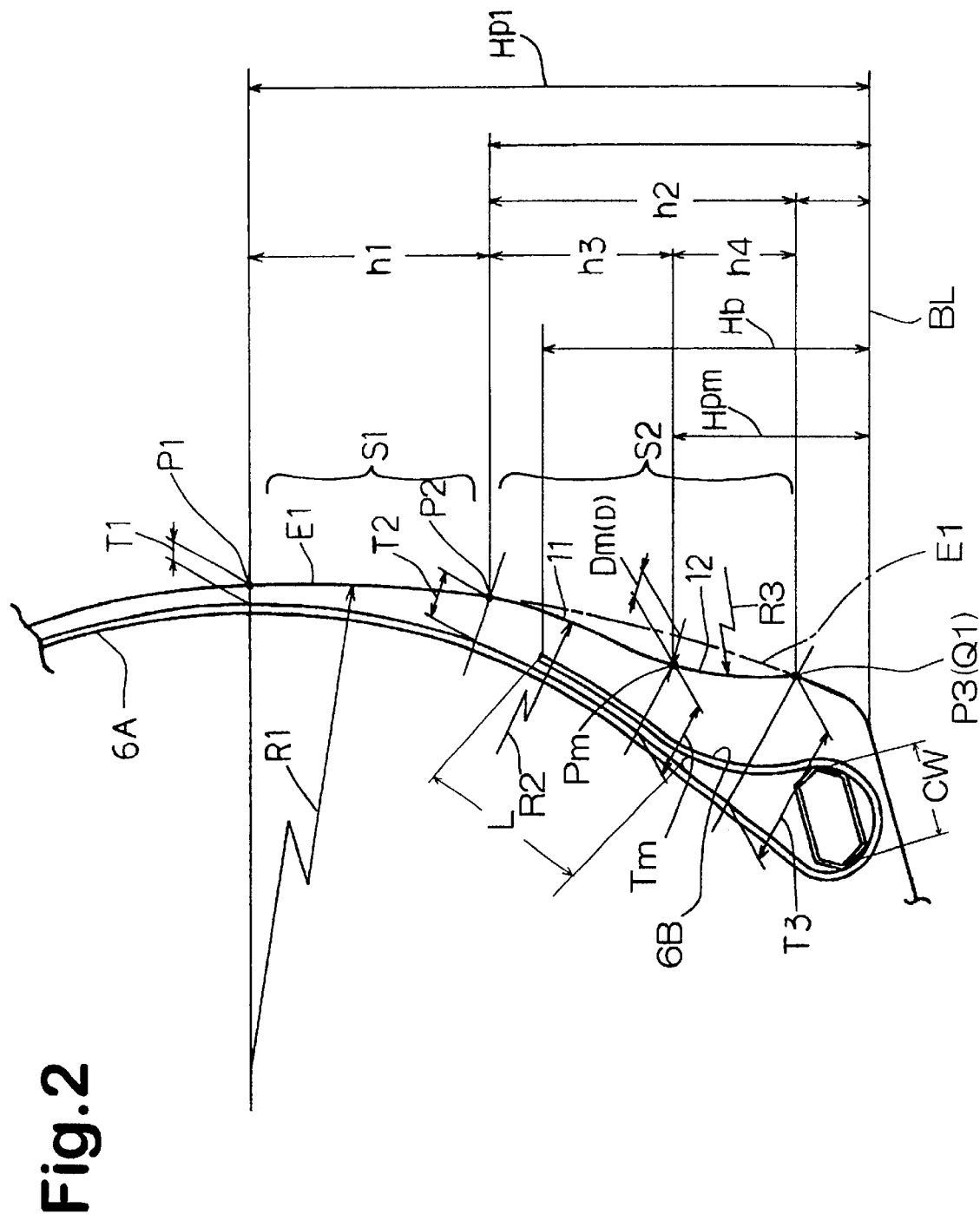
FIG. 2 is an enlarged sectional view showing the bead and lower sidewall structure thereof.

| Tire Contour | Ref. 1 FIG. 11 | Ex. 1 FIG. 2 | Ex. 2 FIG. 2 | Ex. 3 FIG. 2 | Ex. 4 FIG. 2 | Ex. 5 FIG. 2 | Ex. 6 FIG. 2 | Ex. 7 FIG. 2 | Ex. 8 FIG. 2 | Ref. 2 FIG. 12 | Ref. 9 FIG. 2 | Ref. 10 FIG. 2 | Ref. 11 FIG. 2 |
|---|---|---|---|---|---|---|---|---|---|---|---|---|---|
| Hp1 (mm) | 105 | 105 | 105 | 105 | 105 | 105 | 105 | 105 | 105 | 105 | 105 | 105 | 105 |
| R1 (mm) | R350 | R350 | R350 | R350 | R350 | R350 | R350 | R350 | R350 | R120 | R150 | R200 | R350 |
| T1 (mm) | 3.5 | 3.5 | 3.5 | 3.5 | 3.5 | 3.5 | 3.5 | 3.5 | 3.5 | 3.5 | 3.5 | 3.5 | 3.5 |
| T2 (mm) | — | 7.5 | 7.5 | 7.5 | 7.5 | 18 | 14 | 6 | 5 | — | 4.5 | 6.5 | 7.5 |
| Tm (mm) | — | 13 | 11 | 9 | 7.5 | 17 | 15.5 | 11 | 11 | — | 8 | 8 | 11 |
| T3 (mm) | — | 24 | 24 | 24 | 24 | 24 | 24 | 24 | 24 | — | 24 | 24 | 24 |
| Dm (mm) | 3 | 5.5 | 7 | 8.5 | 5.5 | 5.5 | 5.5 | 5.5 | — | 4 | 4 | 5.5 | |
| h1 (mm) | — | 40 | 40 | 40 | 40 | 75 | 65 | 30 | 20 | — | 40 | 40 | 40 |
| h2 (mm) | — | 55 | 55 | 55 | 55 | 20 | 30 | 65 | 75 | — | 55 | 55 | 55 |
| h3 (mm) | — | 30 | 30 | 30 | 30 | 10 | 15 | 40 | 50 | — | 30 | 30 | 30 |
| h4 (mm) | — | 25 | 25 | 25 | 25 | 10 | 15 | 25 | 25 | — | 25 | 25 | 25 |
| Hb (mm) | 55 | 55 | 55 | 55 | 55 | 55 | 55 | 55 | 55 | 35 | 55 | 55 | 35 |
| HP2 (mm) | — | 65 | 65 | 65 | 65 | 30 | 40 | 75 | 85 | — | 65 | 65 | 65 |
| HPm (mm) | — | 35 | 35 | 35 | 35 | 20 | 25 | 35 | 35 | — | 35 | 35 | 35 |
| HP3 (mm) | — | 10 | 10 | 10 | 10 | 10 | 10 | 10 | 10 | — | 10 | 10 | 10 |
| Dm/Hp1 | — | 0.03 | 0.05 | 0.07 | 0.08 | 0.05 | 0.05 | 0.05 | 0.05 | — | 0.04 | 0.04 | 0.05 |
| h2/Hp1 | — | 0.5 | 0.5 | 0.5 | 0.5 | 0.2 | 0.3 | 0.6 | 0.7 | — | 0.5 | 0.5 | 0.5 |
| (T2/T1)/h1 | — | 0.05 | 0.05 | 0.05 | 0.05 | 0.07 | 0.06 | 0.06 | 0.07 | — | 0.03 | 0.05 | 0.05 |
| (Tm/T2)/h3 | — | 0.06 | 0.05 | 0.04 | 0 Tm<T2 | 0.09 | 0.07 | 0.05 | 0.04 | — | 0.06 | 0.04 | 0.05 |
| (T3/Tm)/h4 | — | 0.07 | 0.09 | 0.11 | 0.13 | 0.14 | 0.1 | 0.09 | 0.09 | — | 0.11 | 0.11 | 0.09 |
| Durability | 0.51 | 1 | 1 | 1 | 0.98 | 0.88 | 1 | 1 | 1 | 0.78 | 1 | 1 | 1 |
| Damage* | 1(X) | 3 | OK | OK | 2 | 2 | OK | OK | 3 | 1(Z) | OK | OK | OK |

*Note
1: A swelling was caused by carcass cord loose in the bead portions. The position of the swelling is indicated in (). See the FIG.
2: A swelling was caused by carcass cord loose at the position Pm.
3: A carcass ply turnup edge loose was found by a cut open inspection.
OK: No damage was found.

40 deg. C), and the time until cracks occurred in the region Y was measured. In Table 2, the time is indicated by an index based on that the prior art tire is 100. The larger the index, the better the resistance.

* Principal Strain Test

The principal strain was obtained as explained above, and examined whether a remarkable peak appeared or not, and the maximum principal strain ∈ was measured.

* Tire weight test

The tire weight was measured. In the table 2, the tire weight is indicated by an index based on that the prior art tire is 100. The smaller index is better.

TABLE 2

| Tire | Ex. B1 | Ex. B2 | Ex. B3 | Ex. B4 | Ex. B5 | Ex. B6 | Ex. B7 | Ex. B8 | Ex. B9 | Ref. B1 | Ref. B2 | Prior |
|---|---|---|---|---|---|---|---|---|---|---|---|---|
| L (mm) | 8.3 | 16.3 | 33 | 49.5 | 66 | 82.5 | 33 | 49.5 | 66 | 3.3 | 99 | 0 |
| CW (mm) | 16.5 | 16.5 | 16.5 | 16.5 | 16.5 | 16.5 | 16.5 | 16.5 | 16.5 | 16.5 | 16.5 | 16.5 |
| L/CW | 0.5 | 1 | 2 | 3 | 4 | 5 | 2 | 3 | 4 | 0.2 | 6 | 0 |
| Bead Contour | FIG. 6 | FIG. 6 | FIG. 6 | FIG. 6 | FIG. 6 | FIG. 6 | FIG. 1 | FIG. 1 | FIG. 1 | FIG. 6 | FIG. 6 | FIG. 7 |
| Max. strain (%) | 4.5 | 2 | 2 | 2 | 2 | 2 | 2 | 2 | 2 | 4.5 | 2 | 8.5 |
| Peak | non | non | non | non | non | non | non | non | non | non | non | present |
| Crack | 130 | 300 | 300 | 300 | 300 | 300 | 300 | 300 | 300 | 130 | 300 | 100 |
| Durability | 115 | 135 | 180 | 200 | 200 | 200 | 180 | 200 | 200 | 85 | 200 | 100 |
| Tire weight | 80 | 82 | 85 | 90 | 95 | 99 | 83 | 87 | 92 | 79 | 100 | 100 |

In the tires according to the invention, the principal strain ∈ was decreased under 5.0% and had no peak in the region Y, and the resistance to cracks was greatly improved. In particular, the tires Ex.B3, B4, B5, B7, B8 and B9 in which the parallel part length L was in the range of from 2.0 to 4.0 times the bead core maximum-section-width CW had a good bead durability, and the performance was excellent in total balance. Additionally, the tires Ex. B7, B8 and B9 provided with the above-mentioned contours S1 and S2 could be effectively decreased in the tire weight.

What is claimed is:

1. A pneumatic tire comprising:

a tread portion, a pair of sidewall portions, a pair of bead portions with a bead core therein, a carcass extending between the bead portions through the tread portion and sidewall portions and turned up around the bead cores in the bead portions from the inside to the outside of the tire to form a pair of turnup portions and a main portion therebetween, in a standard condition in which the tire is mounted on a standard rim and inflated to a standard pressure but loaded with no tire load, the outer surface of the tire provided with a mid-lower sidewall contour and a lower side wall contour, the mid-lower sidewall contour extending radially inwardly from a maximum cross sectional width point of the tire to a point along a circular arc line having a single radius and a center on an axial line passing the maximal cross sectional width point, the lower sidewall contour extending on an inside of an imaginary circular arc line extending from the point along the circular arc line to a radially inner point where the lower sidewall contour contacts the rim, wherein a thickness perpendicular to the carcass ply measured from an outer surface of the tire to the main portion of the carcass gradually increases from the maximum cross sectional width point to the point along the circular arc line, the thickness measured from the outer surface of the tire to the main portion of the carcass is gradually increased from the point along the circular arc line to a point at which a depression of the lower sidewall contour from the circular arc line becomes maximum, and a maximum depression at the point at which the depression of the lower sidewall contour from the circular arc line becomes maximum is in a range of from 0.03 to 0.18 times the radial height of the maximum cross sectional width point, and (T2/T1)/h1 being not less than 0.03 wherein T1 is the thickness perpendicular to the carcass ply at the maximum cross sectional width point, T2 is the thickness perpendicular to the carcass ply at the point along the circular arc line, and h1 is the radial height difference between the maximum cross sectional width and the point along the circular arc line.

2. The pneumatic tire according to claim 1, wherein (T2/T1)/h1 is not more than about 1.0.

3. The pneumatic tire according to claim 1, wherein T1 is not less than about 3 mm.

4. A pneumatic tire comprising a tread portion, a pair of sidewall portions, a pair of bead portions with a bead core therein, a carcass extending between the bead portions through the tread portion and sidewall portions and turned up around the bead cores in the bead portions from the inside to the outside of the tire to form a pair of turnup portions and a main portion therebetween, in a standard condition in which the tire is mounted on a standard rim and inflated to a standard pressure but loaded with no tire load, the outer surface of the tire provided with a mid-lower sidewall contour and a lower side wall contour, the mid-lower sidewall contour extending radially inwardly from a maximum cross sectional width point of the tire to a point along a circular arc line having a single radius and a center on an axial line passing the maximal cross sectional width point, the lower sidewall contour extending on an inside of an imaginary circular arc line extending from the point along the circular arc line to a radially inner point where the imaginary line extending from the circular arc line intersects the lower sidewall contour, wherein a thickness perpendicular to the carcass ply measured from an outer surface of the tire to the main portion of the carcass gradually increases from the maximum cross sectional width point to the point along the circular arc line, a maximum depression of the lower sidewall contour from the circular arc line being in the range of from about 0.03 to 0.18 times a radial height of the maximum width point, and a radial height difference between the point along the circular arc line and the radially inner point of from about 0.2 to 0.7 times the height of the radial height of the maximum width point.

5. A pneumatic tire comprising:

a tread portion, a pair of sidewall portions, a pair of bead portions with a bead core therein, a carcass extending between the bead portions through the tread portion and sidewall portions and turned up around the bead cores in the bead portions from the inside to the outside of the tire to form a pair of turnup portions and a main portion therebetween, in a standard condition in which the tire is mounted on a standard rim and inflated to a standard pressure but loaded with no tire load, the outer surface of the tire provided with a mid-lower sidewall contour and a lower side wall contour, the mid-lower sidewall contour extending radially inwardly from a maximum cross sectional width point of the tire to a point along a circular arc line having a single radius and a center on an axial line passing the maximal cross sectional width point, the lower sidewall contour extending on an inside of an imaginary circular arc line extending from the point along the circular arc line to a radially inner point where the imaginary line extending from the circular arc line intersects the lower sidewall contour, wherein a thickness perpendicular to the carcass ply measured from an outer surface of the tire to the main portion of the gradually increases from the maximum cross sectional width point to the point along the circular arc line, the thickness measured from the outer surface of the tire to the main portion of the carcass is gradually increased from the point along the circular arc line to a point at which a depression of the lower sidewall contour from the circular arc line becomes maximum, and a maximum depression at the point at which the depression of the lower sidewall contour from the circular arc line becomes maximum is in a range of from 0.03 to 0.18 times the radial height of the maximum cross sectional width point, and $(T2/T1)/h1$ being not less than 0.03 wherein T1 is the thickness perpendicular to the carcass ply at the maximum cross sectional width point, T2 is the thickness perpendicular to the carcass ply at the point along the circular arc line, and h1 is the radial height difference between the maximum cross sectional width and the point along the circular arc line.

6. The pneumatic tire according to claim 5, wherein $(T2/T1)/h1$ is not more than about 1.0.

7. The pneumatic tire according to claim 5, wherein T1 is not less than about 3 mm.

8. The pneumatic tire according to claim 4, wherein the carcass comprises at least one ply of cords arranged radially at an angle of from 70 to 90 degrees with respect to a tire equator.

9. The pneumatic tire according to claim 4, further comprising a belt disposed radially outside the carcass in the tread portion.

10. The pneumatic tire according to claim 9, wherein the belt comprises at least two cross plies.

11. The pneumatic tire according to claim 9, wherein the belt comprises four plies, wherein a radially innermost ply made of parallel steel cords laid at a predetermined angle of 50 to 70 degrees with respect to the tire equator, and radially outer plies are made of parallel steel cords laid at angle of not more than 30 degrees with respect to the tire equator.

12. The pneumatic tire according to claim 4, wherein the bead core has a hexagonal cross sectional shape.

13. The pneumatic tire according to claim 12, wherein the bead core comprises a wound steel wire coated with rubber.

14. The pneumatic tire according to claim 12, wherein the bead core comprises a wound high modulus organic cords coated with rubber.

15. The pneumatic tire according to claim 4, wherein the maximum depression is from about 3 to 6 mm.

* * * * *